United States Patent
Schmitz et al.

(10) Patent No.: US 7,139,114 B2
(45) Date of Patent: Nov. 21, 2006

(54) BISYMMETRICAL ELECTRIC PAPER AND A SYSTEM THEREFOR

(75) Inventors: Gregory P. Schmitz, Los Gatos, CA (US); Michael B. Heaney, Palo Alto, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 11/017,361

(22) Filed: Dec. 20, 2004

(65) Prior Publication Data

US 2006/0132894 A1    Jun. 22, 2006

(51) Int. Cl.
*G02B 26/00* (2006.01)
(52) U.S. Cl. ..................... 359/296; 345/107
(58) Field of Classification Search .............. 359/84, 359/85, 86, 48, 105, 107, 108, 109, 296; 345/105, 107
See application file for complete search history.

(56) References Cited

U.S. PATENT DOCUMENTS

| | | | |
|---|---|---|---|
| 4,126,854 A | 11/1978 | Sheridon | |
| 5,389,945 A | 2/1995 | Sheridon | |
| 6,222,513 B1 | 4/2001 | Howard et al. | |
| 6,778,198 B1 * | 8/2004 | Dances | 347/148 |
| 2004/0263470 A1 * | 12/2004 | Sprague et al. | 345/107 |

\* cited by examiner

*Primary Examiner*—Hung Xuan Dang
*Assistant Examiner*—Tuyen Tra
(74) *Attorney, Agent, or Firm*—Fay, Sharpe, Fagan, Minnich & McKee, LLP (57) ABSTRACT

The presently described embodiments provide electric paper, in one form, that is bisymmetrical, both sides of the paper have the same thicknesses of mylar layers and the same thicknesses and patterns of ITO islands. In another form, a disordered layer of conductive particles, non-conductive particles and display elements has the same percolation threshold throughout, and thus is bisymmetrical. In either form, in a system for printing all asymmetries in the printing process are transferred to the printhead, just like in conventional ink printers and paper. As a result, both sides of the electric paper are equally capable of being printed on, just like conventional paper, and the electric paper has the same flexural properties when flexed in a concave or convex manner, just like conventional paper. This construction has the additional practical advantage that there is no longer any need to ensure the electric paper is oriented "right side up" before printing on it. These improvements all make electric paper more paper-like in feel and use.

20 Claims, 7 Drawing Sheets

BISYMMETRICAL ELECTRIC PAPER AND A SYSTEM THEREFOR

BACKGROUND

The present exemplary embodiments relate to bisymmetrical electric paper and a system therefor. It finds particular application in conjunction with electric paper applications where it is desired to have the ability to print on either side of the electric paper, and will be described with particular reference thereto. However, it is to be appreciated that the present exemplary embodiments are also amenable to other like applications.

By way of background, electric paper can be defined as any electronically-addressable display medium that approximates paper in form and function. To be most versatile, electric paper should be light-weight, thin and flexible, and it should display images indefinitely while consuming little or no power. In addition, electric paper should be reusable. One must be able to erase images and create new ones repeatedly. Preferably, electric paper should display images using reflected light and allow a very wide viewing angle.

One way to make electric paper possible using traditional electronic display technology is to completely remove the driving electronics from an electronic display package and use external addressing electrodes to write and erase images. This approach both reduces the per unit cost of electric paper sheets and enables the use of cheap, flexible plastic films in place of glass plates for packaging. Multiple electric paper sheets can then be addressed by a single set of external driving electronics, much like multiple sheets of pulp paper are printed on by a single printer.

A known sheet and display system, dubbed Gyricon, is disclosed in various patents and articles, such as U.S. Pat. No. 4,126,854 by Sheridon titled "Twisting Ball Display." The Gyricon display system is comprised of an elastomeric host layer of approximately 300 micrometers thick which is heavily loaded with rotating elements, possibly spheres, tens of micrometers (e.g., 100 micrometers) in diameter that serve as display elements. Each rotating display element has halves of contrasting colors, such as a white half and a black half. Each bichromal rotating element also has an electric dipole moment, nominally orthogonal to the plane that divides the two colored halves. Each bichromal rotating element is contained in its own cavity filled with a dielectric liquid. Upon application of an electric field between electrodes located on opposite surfaces of the host layer, the rotating elements will rotate depending on the polarity of the field, presenting one or the other colored half to an observer.

A Gyricon sheet has many of the requisite characteristics of electric paper, namely, bistable image retention, wide viewing angle, thin and relatively flexible packaging, and high reflectance and resolution. U.S. Pat. No. 5,389,945 issued to Sheridon on Feb. 14, 1995, and titled "Writing System Including Paper-Like Digitally Addressed Media and Addressing Device Therefor," describes an electric paper printing system that employs independent, external addressing means to put images on the Gyricon sheets. The external addressing means is described as a one-dimensional array of electrodes connected, either directly or by wireless technology, to modulating electronics. As the one-dimensional array is scanned across the sheet, modulating electronics adjust the potential at the individual electrodes, creating electric fields between the electrodes and an equipotential surface. An image is created in the sheet according to the magnitude and polarity of the electric fields.

Figure 1:
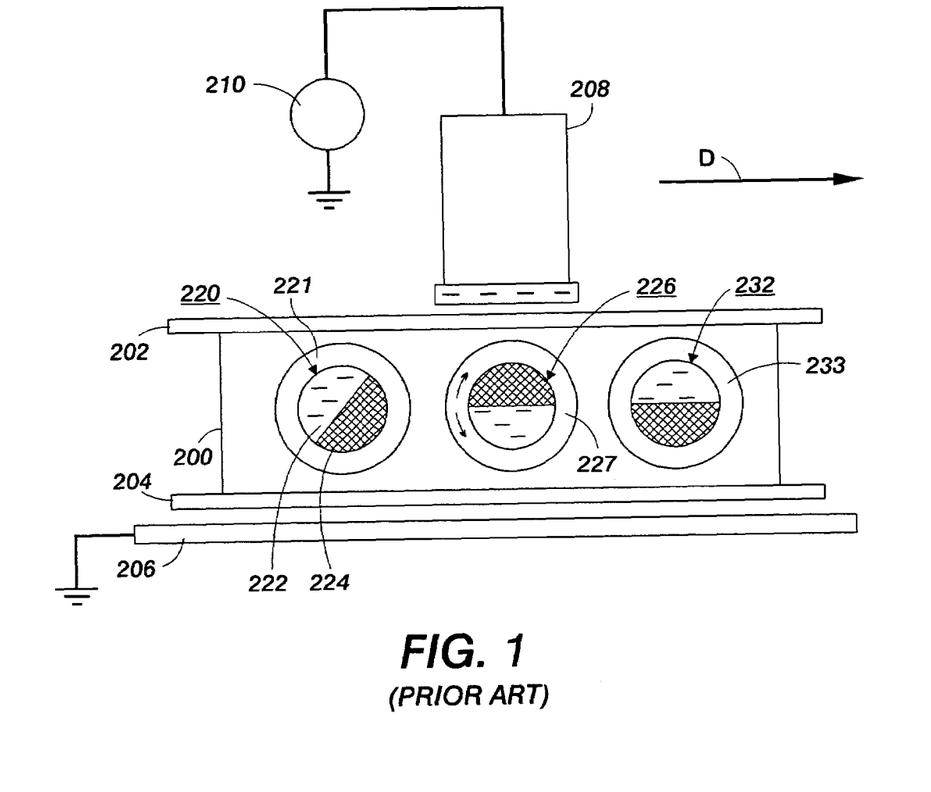
FIG. 1 is a cross-sectional view of a portion of a prior art electric paper configuration.

FIG. 1 shows a representation of a Gyricon sheet comprised of a plurality of bichromal rotating elements, or display elements, cast in a retaining medium, or media plane, 200. It is contained between a first encapsulating layer, or image plane, 202 and a second encapsulating layer 204. The sheet 200 and encapsulating layers 202, 204 are placed in proximity to a supporting back plane 206 that is electrically grounded. The layer 204 and plane 206 comprise a ground plane. An external addressing device 208 connected to a power supply 210 is depicted moving across the sheet in a direction D. Each bichromal sphere, or display element, 220, 226, 232 is contained in its own liquid-filled cavity 221, 227, 233 within the retaining medium 200. An electric field exists directly between the external addressing device 208 and the equipotential surface 206 that causes the local bichromal sphere 226 to rotate.

Figure 2:
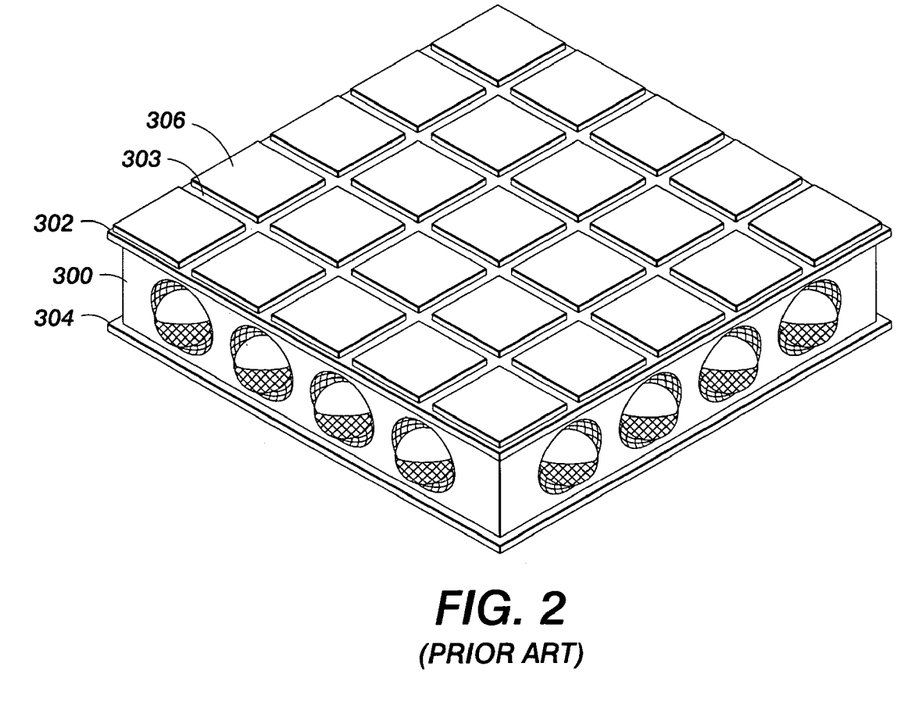
FIG. 2 is a perspective view of a prior art electric paper configuration.

To improve performance, more recent embodiments of these sheets advantageously incorporate charge-retaining islands thereon. U.S. Pat. No. 6,222,513 B1, issued Apr. 24, 2001 and entitled "Charge Islands for Electric Paper and Applications Thereof" describes electric paper having these features. Turning now to FIG. 2, an exemplary Gyricon sheet of this type is shown. The Gyricon sheet is comprised of the following elements: a sheet 300, a first encapsulating layer 302 patterned with conductive charge-retaining islands 306, and a second encapsulating layer 304 that may or may not be patterned with charge-retaining islands.

Together, the first encapsulating layer 302 and the second encapsulating layer 304 do the following things: indefinitely contain a sheet 300, provide at least one transparent window through which the sheet 300 can be viewed, and provide at least one external surface patterned with charge retaining islands 306 that can be addressed with an external charge transfer device. The first encapsulating layer 302 and second encapsulating layer 304 could take the form of thin plastic sheets that are sealed or fastened around the perimeter of the sheet 300. The second encapsulating layer 304 need not be entirely separate from the first encapsulating layer 302. The second encapsulating layer 304 could simply be an extension of the first encapsulating layer 302, folded over and around the edge of the sheet and then sealed or fastened around the remaining perimeter. The first encapsulating layer 302 and second encapsulating layer 304 could also take the form of a coating, applied by spraying, doctoring, or some other method to hold the contents of the sheet 300.

FIG. 2 also shows a pattern for the charge retaining islands 306 of the outer surface of the first encapsulating layer 302. Charge-retaining islands 306 have square perimeters and are organized in a regular two-dimensional array. Narrow channels 303 of insulating material separate the charge-retaining islands 306. The channels 303 serve to isolate the charge-retaining islands 306, preventing migration of charge laterally across the encapsulating sheet, and should be small with respect to the charge-retaining islands 306, so that the maximum possible area of the display is covered with conductive charge-retaining material.

Figure 3:
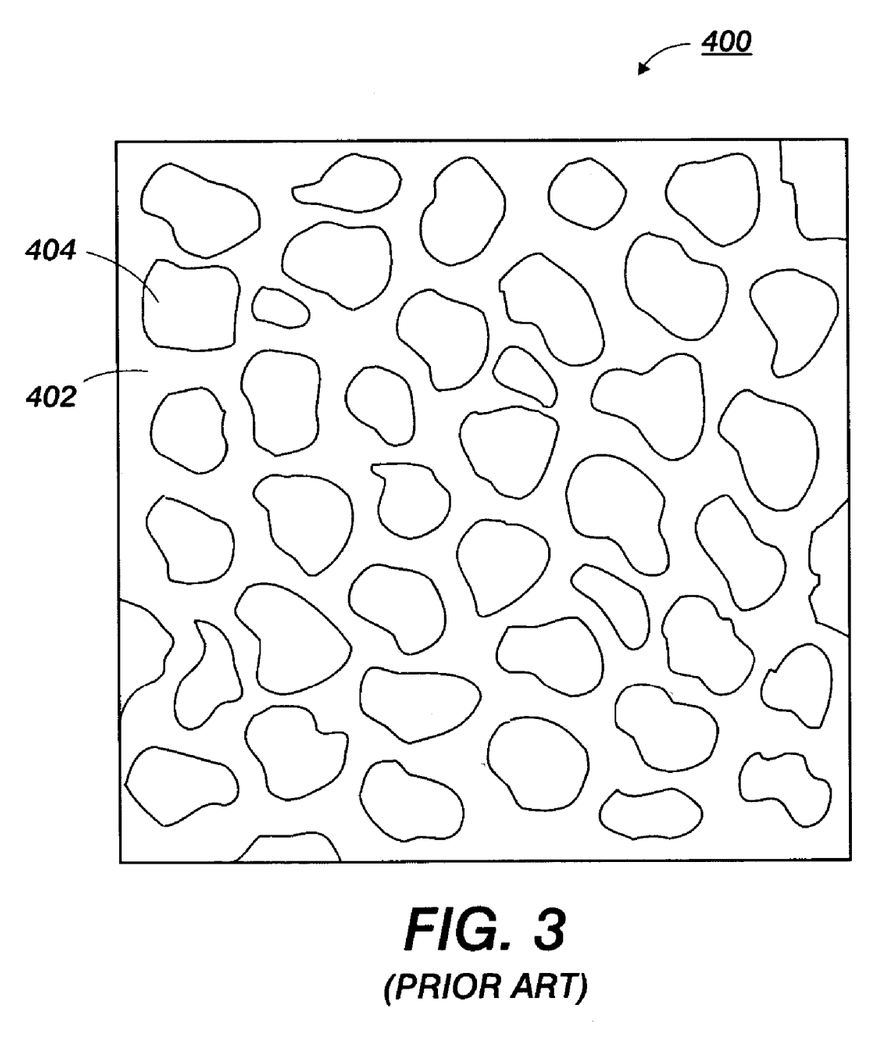
FIG. 3 is a top view of a prior art electric paper configuration.

FIG. 3 simply illustrates a second possible embodiment of a charge-retaining island pattern that utilizes a random array of islands. The top view of the first encapsulating layer 400 shows randomly shaped and oriented charge retaining islands 404 separated by channels 402. The fraction of surface area covered by charge retaining islands 404 must still be relatively large compared to that of the channels 402, but in such a random distribution, both feature sizes must be much smaller than the pixel size of a displayed image.

The charge retaining islands can be created on or in an encapsulating layer by many means with any conductive material. One technique, which has been tested, creates islands of conductive and transparent Indium Tin Oxide (ITO) on a transparent polyester film. The polyester is coated with a very thin layer of ITO, and then channels are etched in the ITO by photolithographic processes well known in the art. The remaining conductive ITO regions act as charge retaining islands, while insulating channels are created by the underlying polyester. Another technique, called Flexography, has also been used to form these island structures on electric paper configurations.

Figure 4:
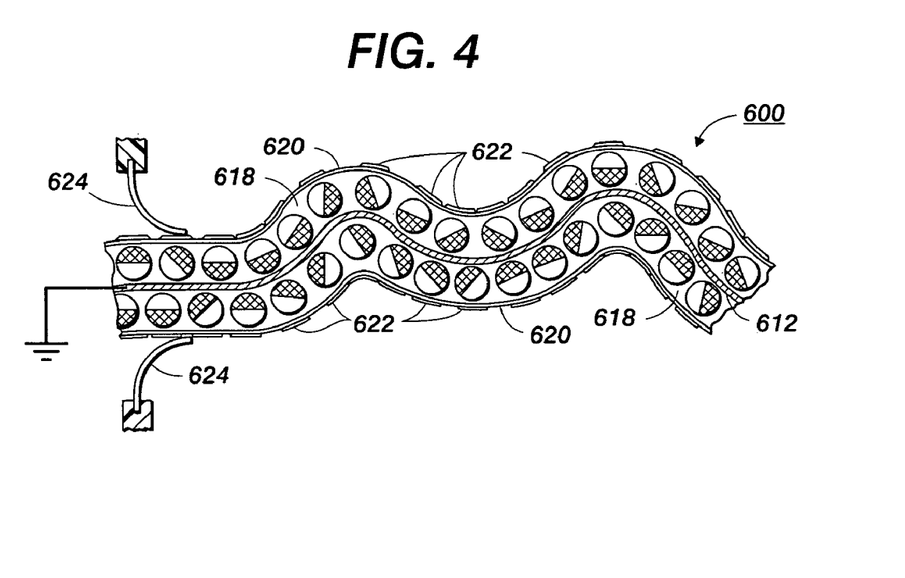
FIG. 4 is a cross-sectional view of a portion of a prior art electric paper configuration.

In U.S. application Ser. No. 10/739,614 filed Dec. 18, 2003, entitled "Flexible Electric Paper Display Apparatus," naming Gregory P. Schmitz, Eric J. Schrader and Michael B. Heaney as inventors, a double-sided electric paper apparatus is disclosed. As illustrated in FIG. 4, this dual-sided electric paper apparatus 600 is illustrated. As shown, a ground plane 612 is shown as having attached to each side thereof a media plane 618. Attached on opposite sides of the media plane are second encapsulating layers 620 which have formed thereon charge retaining islands 622. Also shown are printheads 624 whose operation is well known in the art. Notably, in this embodiment, the ground plane 612 may take a variety of forms that are described in the application, or others. However, it should be noted that the ground plane is flexible to provide the ultimate flexibility of the paper. Moreover, the ground plane in this configuration is preferably non-transparent so that separate images can be viewed on each side. This embodiment allows for improved flexibility over other embodiments of electric paper that do not use a flexible ground plane.

Figure 5:
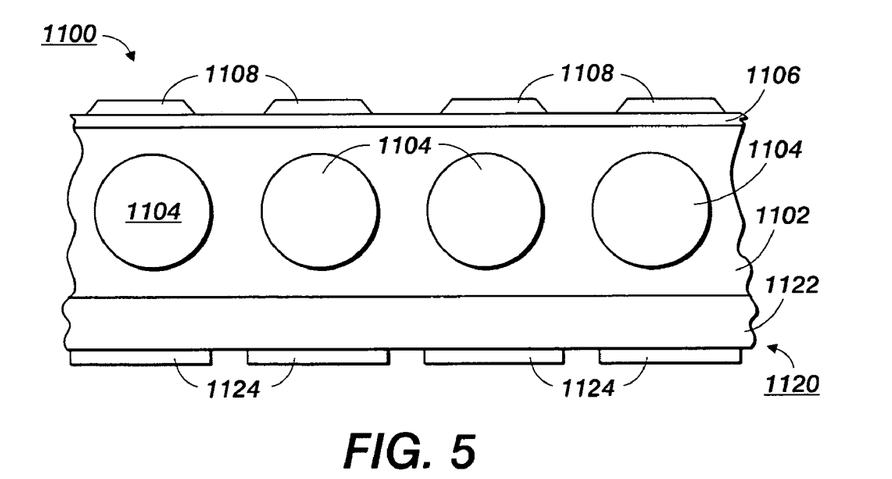
FIG. 5 is a cross-sectional view of a portion of a prior art electric paper configuration.

In U.S. application Ser. No. 10/739,839, filed Dec. 18, 2003, entitled "Improved Flexible and Transparent Ground Plane for Electric Paper," naming Gregory P. Schmitz and Michael B. Heaney as inventors, are illustrated a variety of embodiments of a ground plane that is discontinuous and is implemented together with a conductive ground wiper that touches the discontinuous ground plane. The conductive wiper ensures that the discontinuous ground plane islands opposite the print head are all at uniform ground when the print head is depositing charge on the top surface of the electric paper to form the image. The discontinuous ground plane may be located in a number of locations, as described in that application. With reference to FIG. 5, an electric paper structure incorporating an example discontinuous ground plane is described. As shown, a sheet of electric paper 1100 includes a media plane 1102 having display elements 1104 disposed therein. Electric paper 1100 is also provided with an image plane 1106 having charge retention devices or islands 1108 formed thereon. Notably, the electric paper includes a ground plane assembly 1120 formed by a base layer 1122 and a plurality of grounding bars 1124. It is the discontinuous ground plane assembly 1124 that provides increased flexibility to allow the electric paper to actually be rolled, similar to actual paper.

This type of construction (e.g., the electric paper assemblies of FIGS. 1–3 and 5) is asymmetrical in two ways. First, an indium tin oxide (ITO) layer on the top surface is patterned into unconnected islands, while the ITO layer on the bottom surface is one continuous layer. Second, a mylar layer on the top surface is a different thickness than the mylar on the bottom surface. As a direct consequence of these asymmetries, it is only possible to print on one side of the electric paper, the island side. Another direct consequence of these asymmetries is the flexibility of the electric paper is different for flexing in a concave manner versus a convex manner. Both of these properties make this construction of electric paper less paper-like. The embodiment shown in FIG. 4 can withstand printing on two sides but has other limitations because of the presence of the ground plane.

Figure 6:
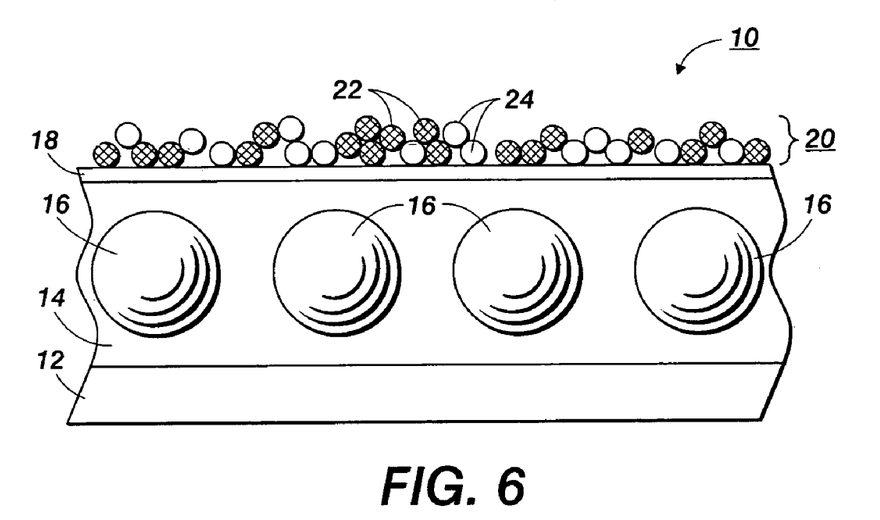
FIG. 6 is a cross-sectional view of a prior art electric paper configuration.
Figure 7:
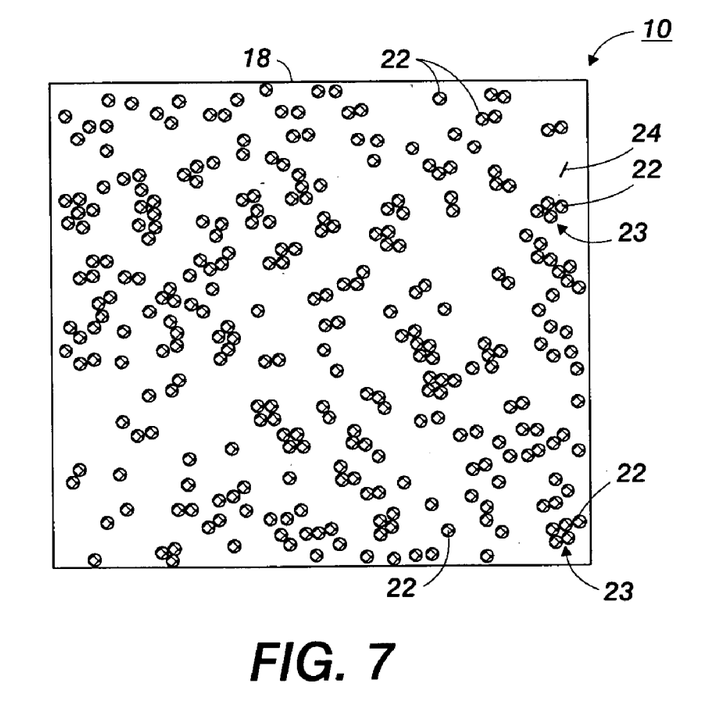
FIG. 7 is a cross-sectional view of a prior art electric paper configuration.
Figure 8:
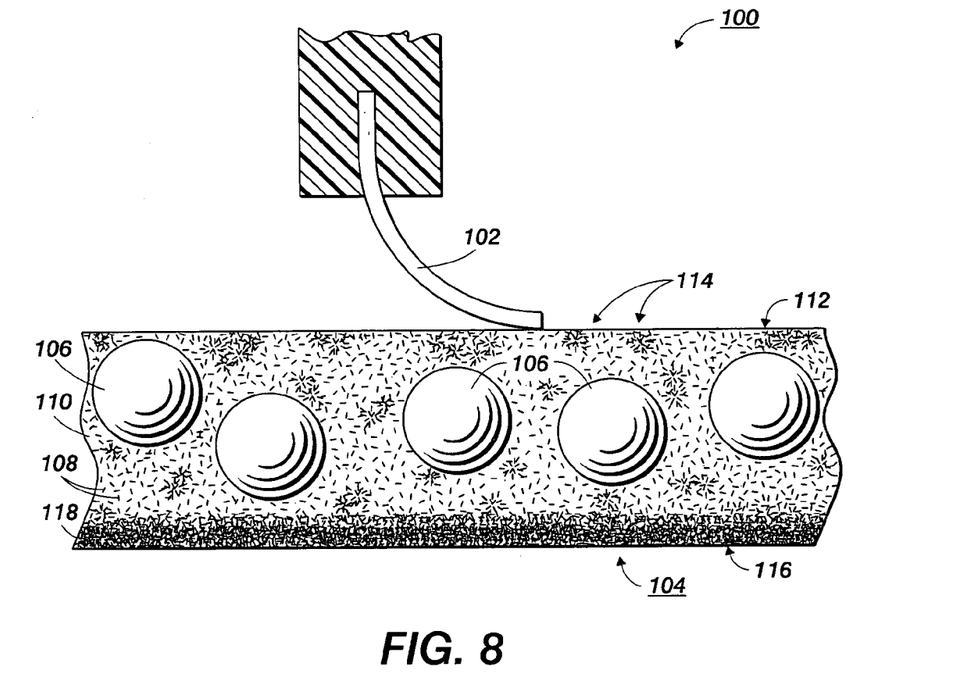
FIG. 8 is a cross-sectional view of a prior art electric paper configuration.

An alternative technique for providing conductivity to the surface of electric paper structure has been developed and described in a commonly assigned and co-pending patent application bearing U.S. Ser. No. 10/739,809, filed Dec. 18, 2003, entitled "Disordered Percolation Layer for Forming Conductive Islands on Electric Paper," and naming Gregory P. Schmitz and Michael B. Heaney as inventors. This alternative approach includes providing an electric paper application including a charge retention layer formed from a disordered mixture of conductive and non-conductive particles. In one form, as shown in FIG. 6, the disordered mixture is attached to a non-conductive surface. For example, randomly mixed and pre-measured amounts of non-conductive particles (e.g., 10 micrometer glass spheres) with conductive particles (e.g., 10 micrometer silver-coated glass spheres) are sprinkled onto a flexible plastic film. The film is coated with adhesive to retain the particles. This film is then joined to the rest of the electric paper structure as an image plane, or encapsulating layer. In another form, as shown in FIG. 7, the randomly pre-mixed amounts of conductive and non-conductive particles are sprinkled directly onto a smooth and sticky layer of the media plane of electric paper. This form provides the advantages noted above as well as the additional advantage that any voltage applied to a conductive island will substantially appear at the surface of the media plane with negligible voltage drop.

In either form, if the relative fractions of conductive and non-conductive particles within the disordered mixture are below a percolation threshold (which can be calculated and measured), then randomly located and shaped conductive islands (comprised of one or more of the silver-coated glass spheres) will be formed. This structure of adhered particles replaces the above-noted conductive island layers formed using photolithographic patterning of ITO films deposited on flexible plastic sheets and other techniques.

In U.S. application Ser. No. 10/927,691, filed Aug. 27, 2004, entitled "Disordered Three-Dimensional Percolation Technique for Forming Electric Paper," naming Michael B. Heaney and Gregory P. Schmitz as inventors, an electric paper structure is illustrated having a single layer, or sheet, of relatively disordered particles that heretofore were separated as uniquely formed layers in electric paper structures. In this regard, the single layer includes display elements, such as bistable pixel structures and conductive particles, both preferably embedded in an insulating matrix of material (e.g., non-conductive particles).The display elements take the exemplary form of microencapsulated bichromal spheres and the conductive particles serve as both conductive island and as a ground plane. The conductive particles form a discontinuous random layer of conductive islands on one side of the sheet, and a continuous electrically conductive percolative network or matrix, or ground plane on the other side of the sheet. This is accomplished by varying the effective percolation threshold across the thickness of the sheet. That is, particle ratios on one side of the sheet are below the percolation threshold (e.g., forming the conductive islands) while the particle ratios on the other side are above the percolation threshold (e.g., forming the ground plane).

BRIEF DESCRIPTION

In accordance with one aspect of the present exemplary embodiments, an electric paper system comprises an electric paper assembly having a first display surface and a second opposed display surface, charge retaining islands being available on both the first display surface and the second display surface, a printhead assembly operative to impart charge to one of the first display surface and the second display surface and a ground plane assembly operative to serve as a ground plane to the other of the first display surface and the second display surface.

In accordance with another aspect of the present exemplary embodiments, the electric paper assembly comprises a display element layer between encapsulating layers having the charge retaining islands disposed therein.

In accordance with another aspect of the present exemplary embodiments, the electric paper assembly comprises a disordered layer of conductive particles, non-conductive particles and display elements.

In accordance with another aspect of the present exemplary embodiments, the conductive particles form the charge retaining islands.

In accordance with another aspect of the present exemplary embodiments, the system further comprises display elements positioned between the first display surface and the second display surface.

In accordance with another aspect of the present exemplary embodiments, the display elements comprise at lease one of microencapsulated bichromal spheres, electric rotating spheres, electrophoretic particles and liquid crystal droplets.

In accordance with another aspect of the present exemplary embodiments, the conductive particles comprise carbon nanotubes.

In accordance with another aspect of the present exemplary embodiments, the conductive particles comprise Indium Tin Oxide (ITO) particles.

In accordance with another aspect of the present exemplary embodiments, an electric paper assembly comprises a first display surface having first charge retaining islands disposed thereon, a second display surface having second charge retaining islands disposed thereon and a display element layer between the first display surface and the second display surface, wherein one of the first display surface and the second display surface is operative to serve as a ground plane for the other of the first display surface and the second display surface during a printing process.

In accordance with another aspect of the present exemplary embodiments, the system further comprises display elements positioned between the first display surface and the second display surface.

In accordance with another aspect of the present exemplary embodiments, the display elements comprise at lease one of microencapsulated bichromal spheres, electric rotating spheres, electrophoretic particles and liquid crystal droplets.

In accordance with another aspect of the present exemplary embodiments, an electric paper assembly comprises conductive particles, nonconductive particles and display elements, wherein the conductive particles, nonconductive particles and the display elements are randomly positioned in an extruded sheet such that a ratio of the conductive particles to at least one of the nonconductive particles and the display elements is below a percolation threshold and further wherein the conductive particles form charge retaining islands that are available to a first display surface of the electric paper and a second display surface of the electric paper.

In accordance with another aspect of the present exemplary embodiments, the conductive particles comprise carbon nanotubes.

In accordance with another aspect of the present exemplary embodiments, the conductive particles comprise Indium Tin Oxide (ITO) particles.

In accordance with another aspect of the present exemplary embodiments, the nonconductive particles comprise transparent material.

In accordance with another aspect of the present exemplary embodiments, the nonconductive particles comprise polymer material.

In accordance with another aspect of the present exemplary embodiments, the nonconductive particles comprise elastomer material.

In accordance with another aspect of the present exemplary embodiments, the display elements comprise at lease one of microencapsulated bichromal spheres, electric rotating spheres, electrophoretic particles and liquid crystal droplets.

DETAILED DESCRIPTION

The presently described embodiments relate to electric paper, in one form, that is bisymmetrical, both sides of the paper have the same thicknesses of mylar layers and the same thicknesses and patterns of ITO islands. In another form, a disordered layer of conductive particles, non-conductive particles and display elements has the same percolation threshold throughout, and thus is bisymmetrical. In either form, all asymmetries in the printing process are transferred to the printhead, just like in conventional ink printers and paper.

Under the presently described embodiments, both sides of the electric paper are equally capable of being printed on, just like conventional paper, and the electric paper has the same flexural properties when flexed in a concave or convex manner, just like conventional paper. This construction has the additional practical advantage that there is no longer any need to ensure the electric paper is oriented "right side up" before printing on it. These improvements all make electric paper more paper-like in feel and use.

Figure 9:
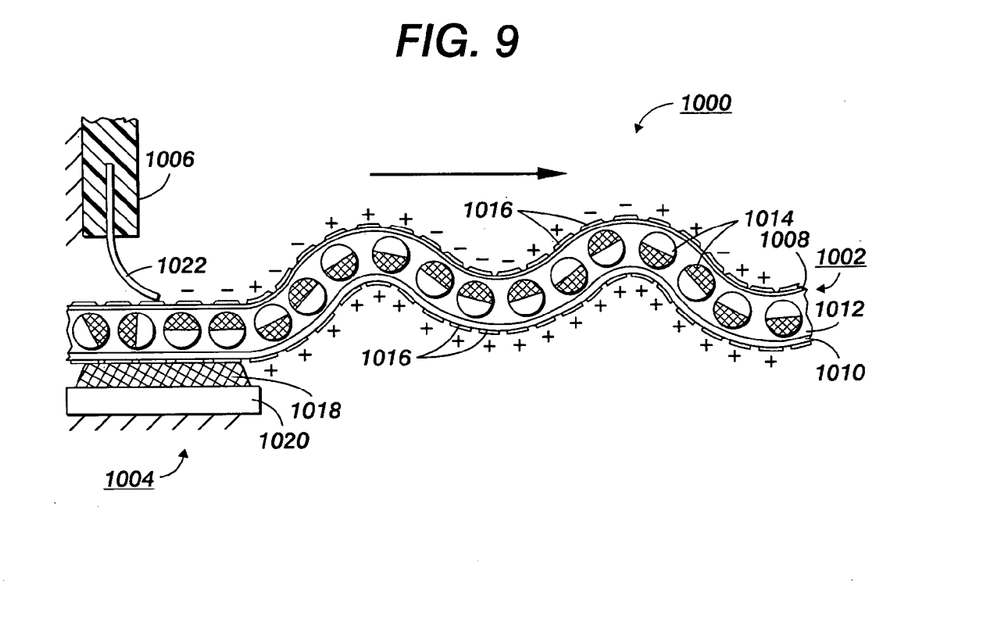
FIG. 9 is a cross-sectional view of an electric paper system according to the presently described exemplary embodiments; and, FIG. 10 is a cross-sectional view of an electric paper system according to the presently described exemplary embodiments.

With reference to FIG. 9, an electric paper system 1000 includes an electric paper assembly or apparatus 1002, a printhead 1006 and a ground plane assembly 1004. It should be appreciated there may be other portions of the system that are not shown but could take a variety of configurations to support the printing on at least one side of the electric paper apparatus 1002. For example, a technique to support conveyance of the electric paper device through the printer and over the ground plane assembly 1004 may be embodied in the system. As an alternative, the printhead 1006 and ground plane assembly 1004 may be translated relative to the electric paper assembly 1002. It should be understood that the ground plane assembly may be formed as a part of the printer, or it may simply be an external mechanism that is compatible with the selected printer.

It should be understood that the electric paper assembly 1002 may take a variety of forms including the one shown, or other electric paper embodiments (such as the one illustrated in connection with FIG. 10 below). Indeed, the electric paper assembly used in the presently described embodiments may implement many of the features and qualities of the previously known configurations of electric paper, such as those outlined above, provided that conductive islands are available on both sides of the electric paper and no viable ground plane is provided therewithin.

As shown, electric paper device 1002 includes encapsulating layers 1008 and 1010, having disposed therebetween a display layer 1012 including the display elements 1014. The display elements may be supported within the layer 1012 in a variety of different manners; however, they are shown within an insulative layer 1014. Also shown as a part of the electric paper assembly are charge retaining islands 1016 formed on both display surfaces of the electric paper assembly.

Notably, electric paper 1002 does not include a ground plane layer, thus making the entire combination of layers thinner and more flexible. There is also no need to make electric contact to a central ground plane. In addition, the encapsulating layers are, in one form, formed of flexible mylar of similar thickness while the layer including the display elements is, in one form, an elastomer sheet saturated with oil. Of course, the exemplary charge retaining islands are formed from Indium Tin Oxide (ITO) material that is separated to form the islands, as is known. Other techniques may be used for doing so.

The display elements 1014 may take a variety of forms but, in one embodiment, display elements 1014 are bi-stable pixel elements such as microencapsulated bichromal spheres, which are known in the field. Any electric rotating sphere, electrophoretic particles, liquid crystal droplets, etc. may be used to form a display or media plane. The display elements may also each comprise a plurality of display particles housed within a single microencapsulated structure. Any of these forms, or other suitable forms, may be used in connection with the presently disclosed embodiments of electric paper provided that the display elements are reactive to electric field to facilitate electric printing as described above.

It should also be understood that, while the display elements are shown as being much larger that the conductive and non-conductive particles for ease of illustration, such difference in particle size may not be desired. For example, for improved resolution, the size of the display element should be approximately the same size as the conductive particles. This will allow one conductive particle, or island, to control no more than one display element. If the conductive particles are significantly larger than the display elements, the conductive particles may be able to control more than one display element. As such, the resolution will be dictated by the size of the conductive particle or island—which is not typically desired.

In addition, the display elements are shown as being in a particular configuration within the sheet, for ease of explanation. However, in the contemplated mixture, it should be understood that these display elements (as well as other particles in the mixture) may be randomly distributed and will likely take on different random configurations for different implementations.

The ground plane assembly 1004 may take a variety of configurations depending on the form of the printhead. The ground plane assembly is, in one form, as wide as is necessary to provide a suitable ground plane assembly for the printhead. In at least one form, the ground plane assembly would be as wide as a page. In other forms, it may be only as wide as the usable width of the printhead being used. As shown, the ground plane assembly comprises a grounding bar 1018 and a support structure 1020, although a variety of configurations may be used.

The printhead 1006 may likewise take a variety of suitable forms. In this regard, it may take the form of any of a variety of addressable arrays that are operative to impart charge in a selected pattern. As shown, the printhead includes a wiper 1022 which can be drawn across the page in relation to the ground plane in a variety of different manners. The printhead may be translated across the page or the page may be conveyed under the printhead and over the ground plane assembly. In either case, such printing technology is well known to those skilled in the art.

Figure 10:
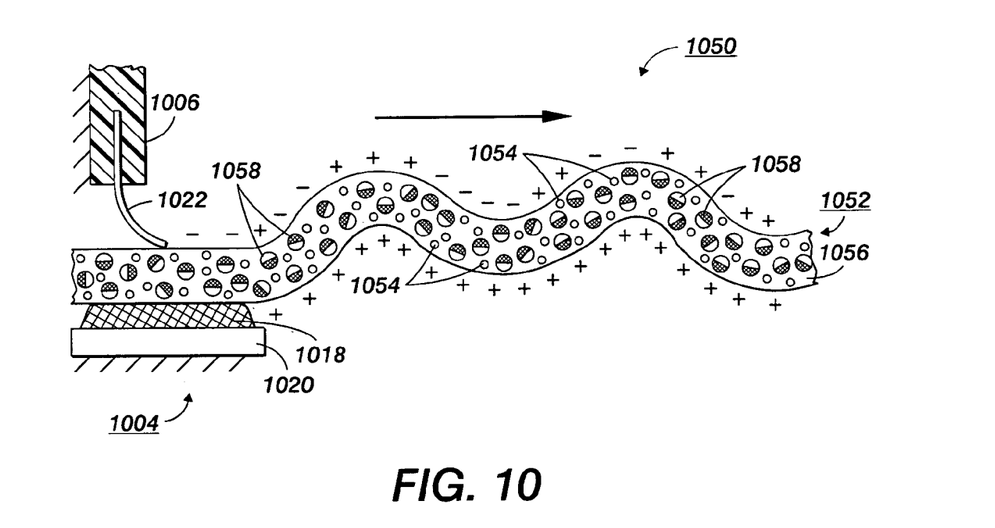

With reference to FIG. 10, an alternative to the printing system of FIG. 9 is shown. In this system 1050, electric paper device 1002 is replaced with an alternative electric paper assembly 1052. It should be appreciated that the other elements of the system, shown and not shown, would operate in substantially the same manner as previously described. However, with respect to the electric paper assembly 1052, it comprises a single sheet of disordered particles. These disordered particles include conductive particles 1054, non-conductive particles 1056 (not shown as separate particles for ease of reference), and display elements 1058. Notably, the percolation threshold through the entire cross-section of the electric paper 1052 is the same. There is no need to alter the percolation threshold to provide a ground plane, as in a previous configuration. As will be appreciated according to the presently described embodiments, the ground plane of the printer will provide suitable grounding capabilities.

Moreover, it should be understood that calculation of a suitable percolation threshold will result in the availability of charge retaining islands at both display surfaces of the electric paper assembly.

As above, the display elements 1058 may take a variety of forms and sizes. Further, the conductive particles 1054 may take a variety of suitable forms. In the embodiments described herein, the conductive particles are transparent (or will cure to a transparent form). For example, the conductive particles 1054 may be embodied in carbon nanotube structures. Such nanotube structures are known to those in the field. An example of one suitable structure is described in P. J. Glatkowski, "Carbon Nanotube Based Transparent Conductive Coatings," www.eikos.com (updated at least as of Jun. 2, 2003), and in U.S. Pat. No. 6,265,466 B1, both of which are incorporated herein by reference. Carbon nanotubes are a suitable candidate for the conductive particles because such structures can be relatively transparent and have a low percolation threshold and also allow a more flexible medium. In this way, a mixture using carbon nanotube structures, as opposed to other conductive particles, will require less of these structures to reach the percolation threshold. Thus, properties of other substances with which the nanotubes may be mixed are not greatly impacted by the nanotubes. Consequently, carbon nanotubes are used to make thin, transparent and flexible film. In addition, carbon nanotubes typically exhibit high electrical and thermal conductivity, high strength, and high strain to failure.

The conductive particles 1054 may also take the form of Indium Tin Oxide (ITO) particles. These particles may be formed by pulverizing ITO material into appropriately sized particles.

Of course, variations of these forms of particles may also be used. For example, the size of the particles may vary. Moreover, the shape of the particles may vary, provided that the selected shape is conducive to conductivity and the random formation of charge retaining islands. As is known, the charge retention layer is useful to hold electric charge near the display elements.

The non-conductive particles, or insulative material, 1056 may likewise take a variety of suitable forms. For example, the non-conductive particles may be made from polymer material. Similarly, such particles may be formed from elastomer or rubber material. Of course, the non-conductive material is transparent (or will cure to a transparent form) in the embodiments described herein. In some embodiments, the non-conductive material may also resemble paper in its look and feel.

In this type of configuration, the amount of the conductive particles relative to non-conductive particles (and, in some cases, the display elements) is calculated to ensure a suitable distribution of the particles within the sheet. It should be understood that, depending on the number of display elements used, the display elements may or may not need to be included in the calculation. Where the number of display elements is negligible relative to the number of conductive and non-conductive particles, the display elements may be excluded from the calculation. Conversely, the number of display elements should be included in the calculation where the display elements have an impact on the conductive matrix formed in the sheet.

The determination of the amount of the conductive particles relative to at least one of the non-conductive particles and the display elements is accomplished to obtain a value that, in one form, is below a percolation threshold for the particles as applied to the electric paper. The conductive particles, or charge retaining islands, will then be electrically isolated from one another by the non-conductive material during the extrusion process. So, the mixture of the particles within the resultant sheet will merely contain random conductive islands on both sides of the sheet.

The determination of this value of conductive particles can be accomplished using well known percolation theory and experiments. See, e.g., Zallen, R., *The Physics of Amorphous Solids*, John Wiley & Sons, New York, N.Y. (1983); Sahimi, M., *Applications of Percolation Theory*, Taylor & Francis, Bristol, Pa. (1994); and, Stauffer, D., and Aharony, A., *Introduction to Percolation Theory*, second edition, Taylor & Francis, Bristol, Pa. (1991), all of which are incorporated herein by reference.

Also, the following calculation may be used to calculate the average conductive island size $\xi$:

$$\xi = \xi_o \left[ \frac{(p_c - p)}{(1 - p_c)} \right]^{-\nu}$$

where $\xi$ is the correlation length, $\xi_o$ is the correlation length scale factor, $p_c$ is the percolation threshold, p is the volume fraction of conductive particles and $\nu$ is the correlation length critical exponent. This is described in more detail in Heaney, M. B., "Measurement and Interpretation of Non-universal Critical Exponents in Disordered Conductor-insulator Composites," Physical Review B, v. 52, no. 17, pages 12477–12480 (1995), which is incorporated herein by reference. For conducting and insulating spheres in a randomly closed pack distribution, $p_c$=0.45 (in two dimensions) and $p_c$=0.16 (in three dimensions). See also, Heaney, M. B., "Imaging and Electrical Resistivity Measurements of Disordered Carbon-Black-Polymer Composites," in *Semiconducting Polymers: Applications, Properties, and Synthesis*, edited by B. R. Hsieh and Y. Wei, pages 8–29 (1999), which is incorporated herein by reference.

Once the appropriate amounts of display elements, conductive particles, and insulative material (or non-conductive particles) are determined, these components are combined and mixed randomly. This, of course, can be accomplished any of a variety of mixing techniques, provided that the final mixture consists of a random distribution of components.

The mixture is then extruded into a sheet and cured. Any suitable extrusion process may be implemented. However, the curing process should be such that the ratio of conductive to non-conductive particles remains relatively constant throughout the material.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications, variations, improvements, and substantial equivalents.

The invention claimed is:

1. An electric paper system comprising:
   an electric paper assembly having a first display surface and a second opposed display surface, charge retaining islands being available on both the first display surface and the second display surface, wherein both of the display surfaces of the electric paper are configured to be printed on;
   a printhead assembly operative to impart charge to one of the first display surface and the second display surface; and,
   a ground plane assembly operative to serve as a ground plane to the other of the first display surface and the second display surface.

2. The system as set forth in claim 1 wherein the electric paper assembly comprises a display element layer between encapsulating layers having the charge retaining islands disposed therein.

3. The system as set forth in claim 1 wherein the electric paper assembly comprises a disordered layer of conductive particles, non-conductive particles and display elements.

4. The system as set forth in claim 3 wherein the conductive particles form the charge retaining islands.

5. The system as set forth in claim 3 wherein the conductive particles comprise carbon nanotubes.

6. The system as set forth in claim 3 wherein the conductive particles comprise Indium Tin Oxide (ITO) particles.

7. The system as set forth in claim 1 further comprising display elements positioned between the first display surface and the second display surface.

8. The system as set forth in claim 7 wherein the display elements comprise at least one of microencapsulated bichromal spheres, electric rotating spheres, electrophoretic particles and liquid crystal droplets.

9. The system according to claim 1 wherein the ground plane assembly is not a ground plane layer which covers substantially all of one surface of the electric paper, but rather the ground plane assembly is configured to cover substantially less than all of one surface of the electric paper.

10. The system according to claim 1 wherein the electric paper has the same flexural properties when flexed in a concave or convex manner.

11. An electric paper assembly comprising:
a first display surface having first charge retaining islands disposed thereon;
a second display surface having second charge retaining islands disposed thereon, wherein both of the display surfaces of the electric paper are configured to be printed on; and,
a display element layer between the first display surface and the second display surface, wherein one of the first display surface and the second display surface is operative to serve as a ground plane for the other of the first display surface and the second display surface during a printing process.

12. The system as set forth in claim 11 further comprising display elements positioned between the first display surface and the second display surface.

13. The system as set forth in claim 12 wherein the display elements comprise at least one of microencapsulated bichromal spheres, electric rotating spheres, electrophoretic particles and liquid crystal droplets.

14. An electric paper assembly comprising:
conductive particles;
nonconductive particles; and,
display elements;
wherein the conductive particles, nonconductive particles and the display elements are randomly positioned in an extruded sheet such that a ratio of the conductive particles to at least one of the nonconductive particles and the display elements is below a percolation threshold and further wherein the conductive particles form charge retaining islands that are available to a first display surface of the electric paper and a second display surface of the electric paper wherein both of the display surfaces of the electric paper are configured to be printed on.

15. The apparatus as set forth in claim 14 wherein the conductive particles comprise carbon nanotubes.

16. The apparatus as set forth in claim 14 wherein the conductive particles comprise Indium Tin Oxide (ITO) particles.

17. The apparatus as set forth in claim 14 wherein the nonconductive particles comprise transparent material.

18. The apparatus as set forth in claim 14 wherein the nonconductive particles comprise polymer material.

19. The apparatus as set forth in claim 14 wherein the nonconductive particles comprise elastomer material.

20. The system as set forth in claim 14 wherein the display elements comprise at least one of microencapsulated bichromal spheres, electric rotating spheres, electrophoretic particles and liquid crystal droplets.

* * * * *

UNITED STATES PATENT AND TRADEMARK OFFICE
CERTIFICATE OF CORRECTION

| | | |
|---|---|---|
| PATENT NO. | : 7,139,114 B2 | Page 1 of 1 |
| APPLICATION NO. | : 11/017361 | |
| DATED | : November 21, 2006 | |
| INVENTOR(S) | : Gregory P. Schmitz and Michael B. Heaney | |

It is certified that error appears in the above-identified patent and that said Letters Patent is hereby corrected as shown below:

Title Page: Please insert;

(73) Assignee: Palo Alto Research Center Incorporated, Palo Alto, CA (US)

and delete Xerox Corporation

Signed and Sealed this

Nineteenth Day of August, 2008

JON W. DUDAS
*Director of the United States Patent and Trademark Office*